Figure 9:
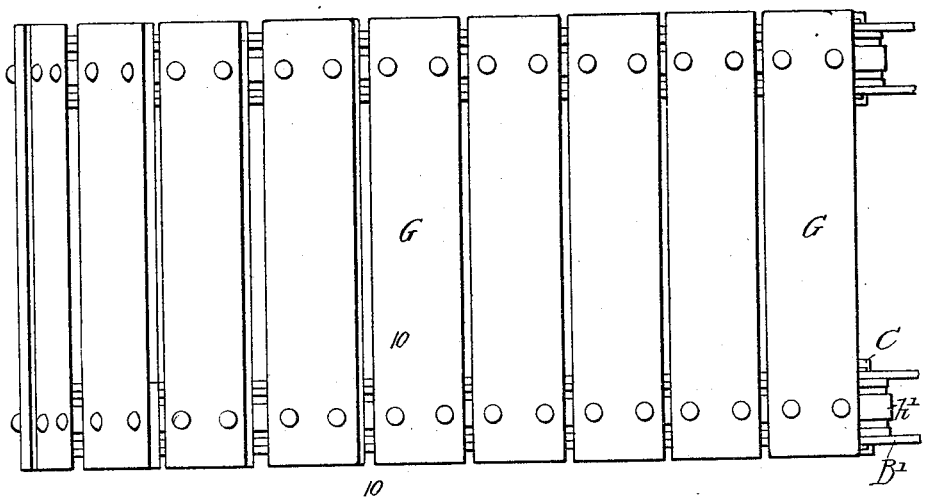

No. 806,700. PATENTED DEC. 5, 1905.
J. B. McKENNAN & A. H. HELANDER.
LINK FOR CONVEYERS.
APPLICATION FILED FEB. 28, 1905.
6 SHEETS—SHEET 1.
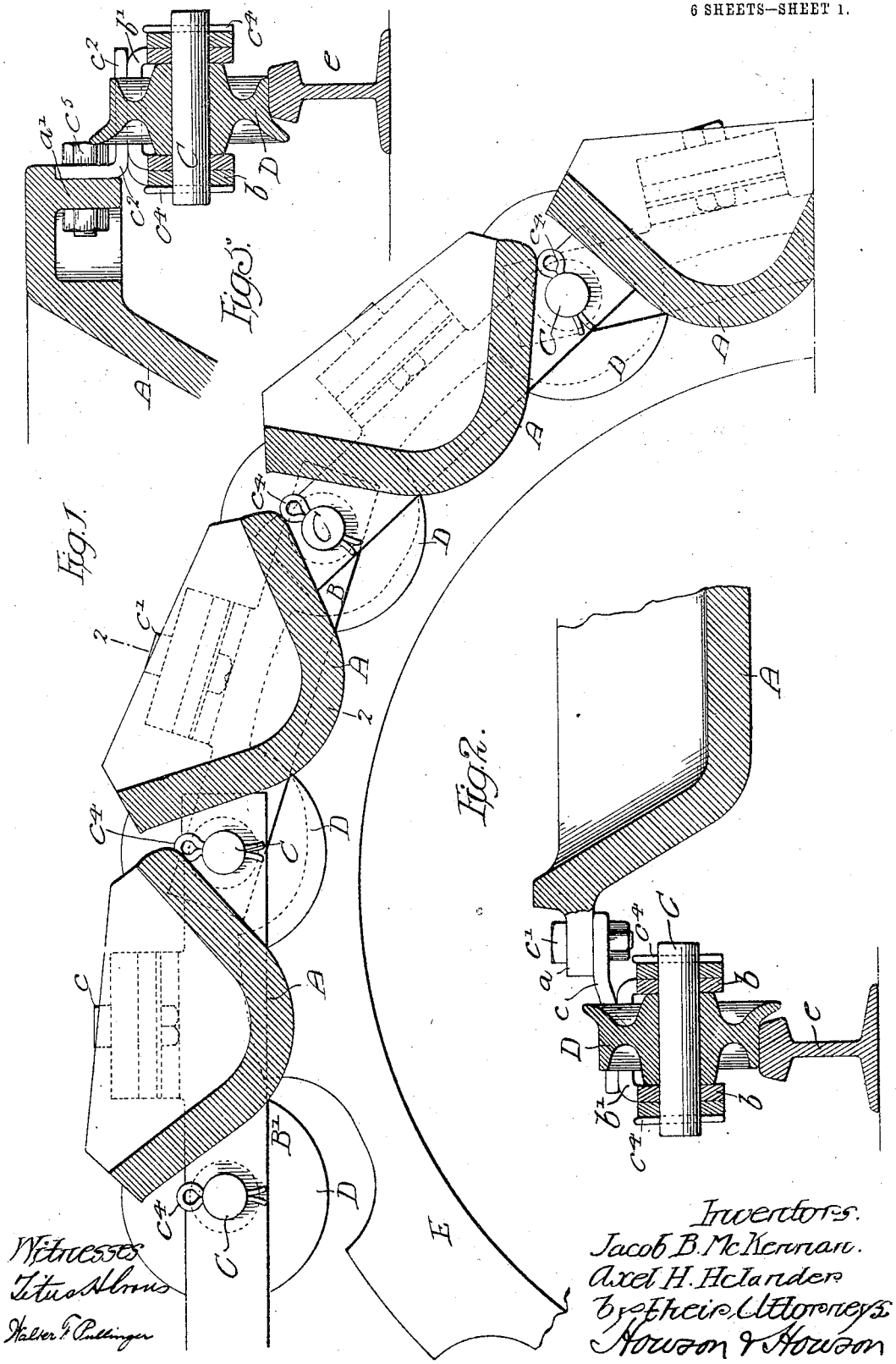
Witnesses
Titus Ulms
Walter G. Pullinger
Inventors.
Jacob B. McKennan.
Axel H. Helander
by their Attorneys
Howson & Howson

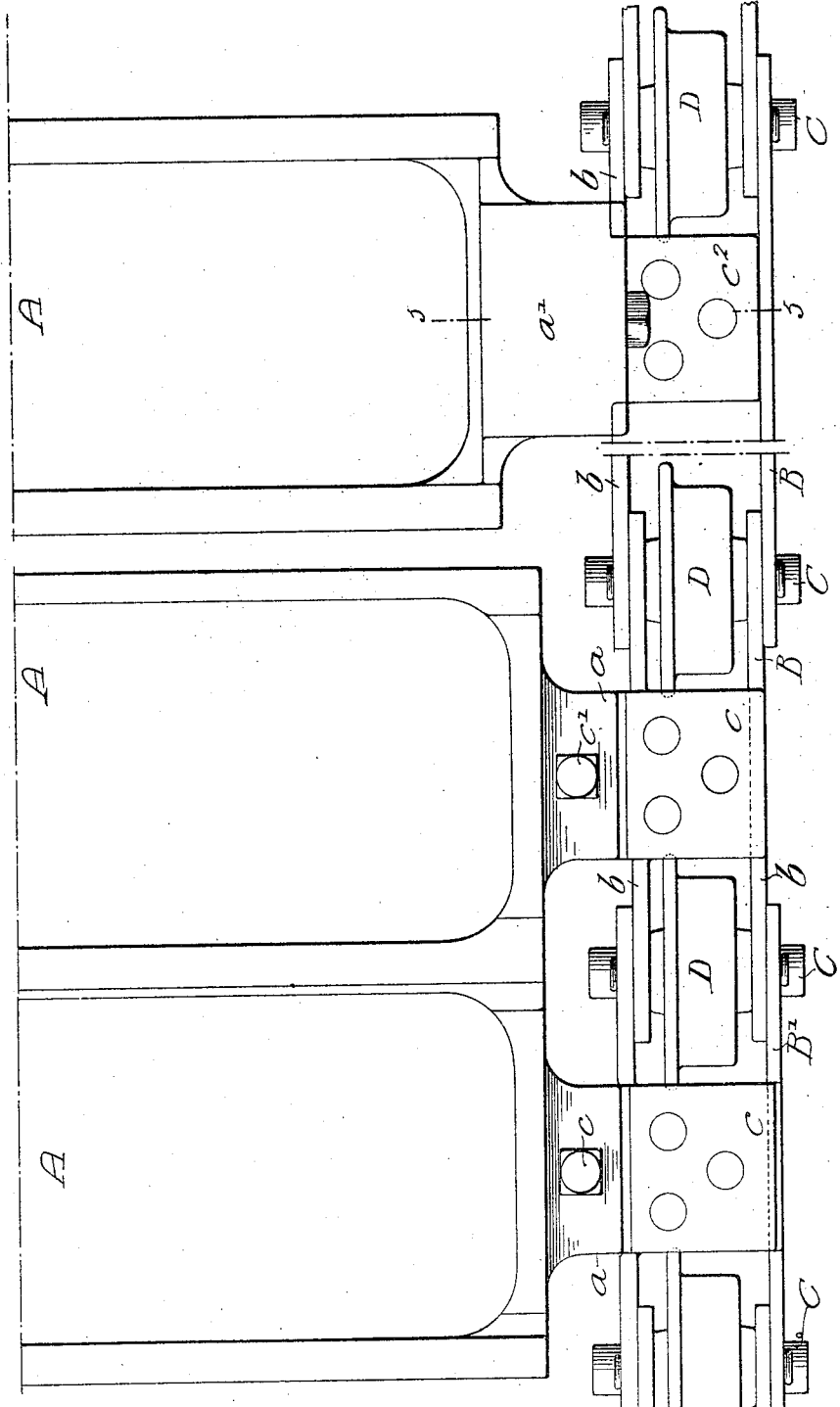

No. 806,700. PATENTED DEC. 5, 1905.
J. B. McKENNAN & A. H. HELANDER.
LINK FOR CONVEYERS.
APPLICATION FILED FEB. 28, 1905.
6 SHEETS—SHEET 3.
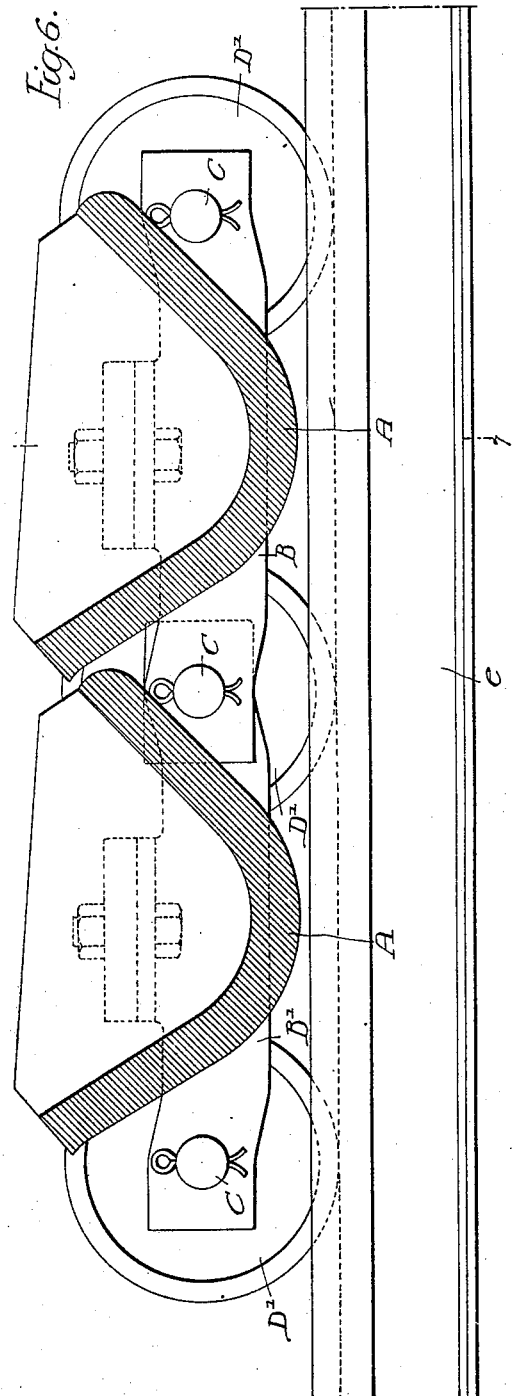
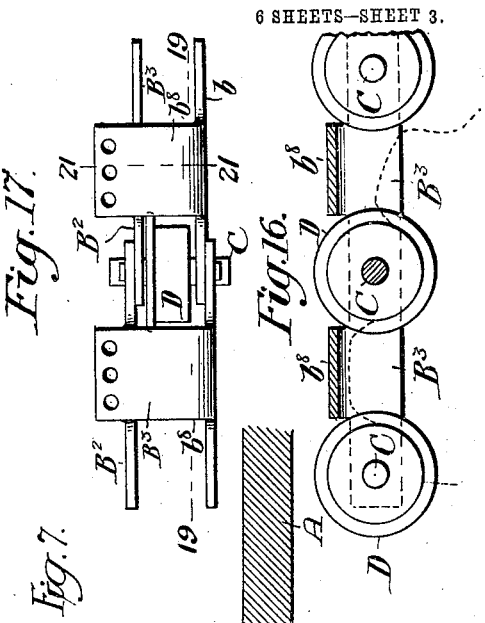
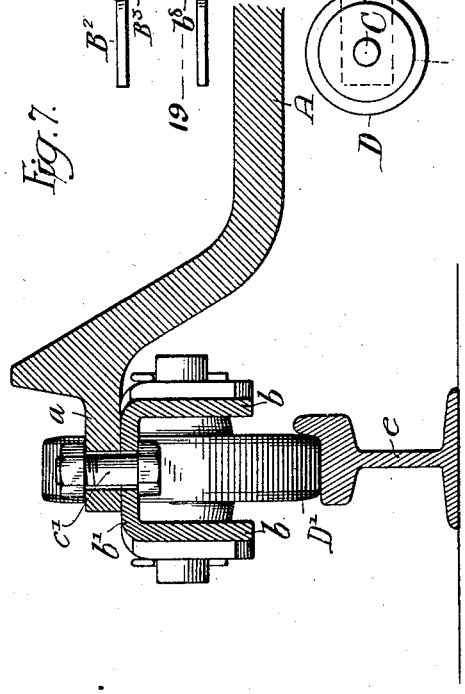
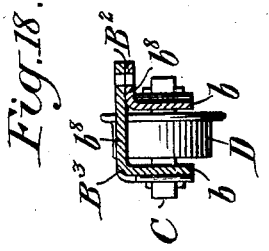
Witnesses:
Titus N. Ives
Walter F. Pullinger
Inventors,
Jacob B. McKennan.
Axel H. Helander.
by their Attorneys,
Howson & Howson No. 806,700. PATENTED DEC. 5, 1905.
J. B. McKENNAN & A. H. HELANDER.
LINK FOR CONVEYERS.
APPLICATION FILED FEB. 28, 1905.

6 SHEETS—SHEET 5.

Witnesses
Titus H. Graus.
Walter T. Pullinger.

Inventors:
Jacob B. McKennan.
Axel H. Helander.
by their Attorneys.
Howson & Howson No. 806,700. PATENTED DEC. 5, 1905.
J. B. McKENNAN & A. H. HELANDER.
LINK FOR CONVEYERS.
APPLICATION FILED FEB. 28, 1905.

6 SHEETS—SHEET 6.

Witnesses:
Titus H. Ivins
Walter F. Pullinger

Inventors:
Jacob B. McKennan
Axel H. Helander
by their Attorneys,
Howson & Howson

UNITED STATES PATENT OFFICE.

JACOB B. McKENNAN AND AXEL H. HELANDER, OF PUEBLO, COLORADO.

LINK FOR CONVEYERS.

No. 806,700.  Specification of Letters Patent.  Patented Dec. 5, 1905.

Application filed February 28, 1905. Serial No. 247,740.

*To all whom it may concern:*

Be it known that we, JACOB B. MCKENNAN and AXEL H. HELANDER, citizens of the United States, residing in Pueblo, Colorado, have invented certain Improvements in Links for Conveyers, of which the following is a specification.

One object of our invention is to provide a link of such construction that any load carried shall be evenly distributed upon the pins or spindles which serve to connect adjacent links and which in the form of the invention shown in the drawings herewith also serve as journals for the conveyer-supporting wheels.

More particularly we desire to provide a form of link for use in connection with pig-casting machines of such a nature that the weight of the individual pig-molds shall be carried upon both ends of the pins, which serve as journals for the guide-wheels and which also serve to connect the adjacent ends of the successive links.

These objects we attain as hereinafter set forth, reference being had to the accompanying drawings, in which—

Figure 8:
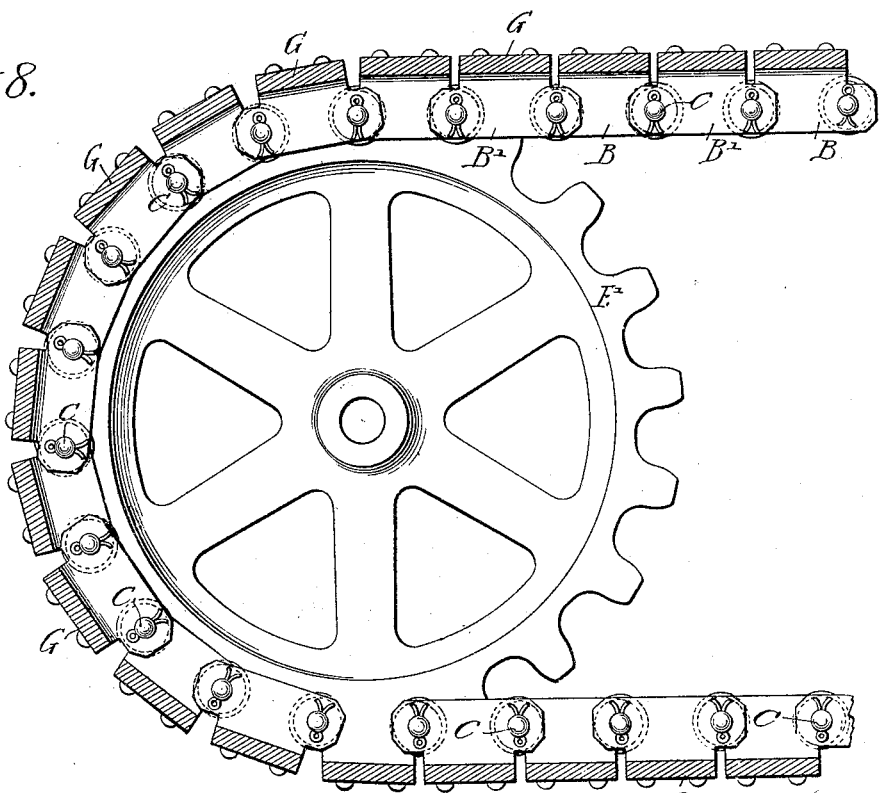
Figure 10:
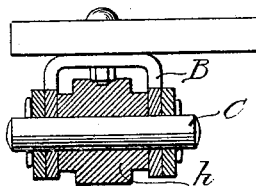
Figure 12:
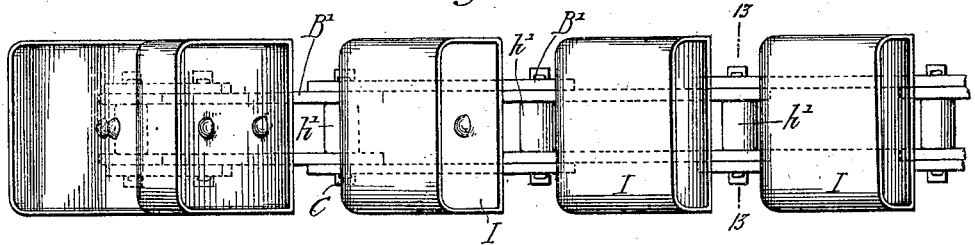
Figure 11:
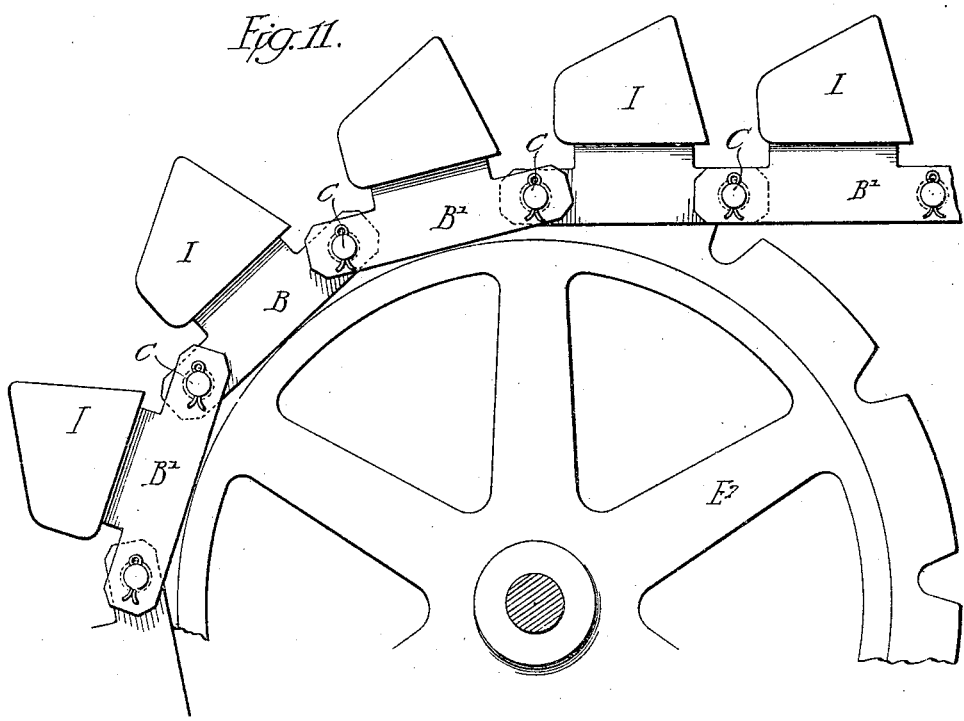
Figure 13:
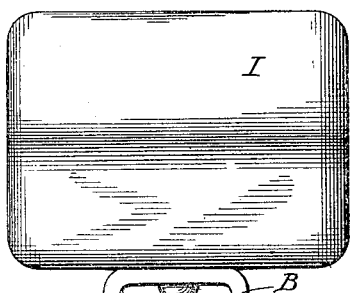
Figure 14:
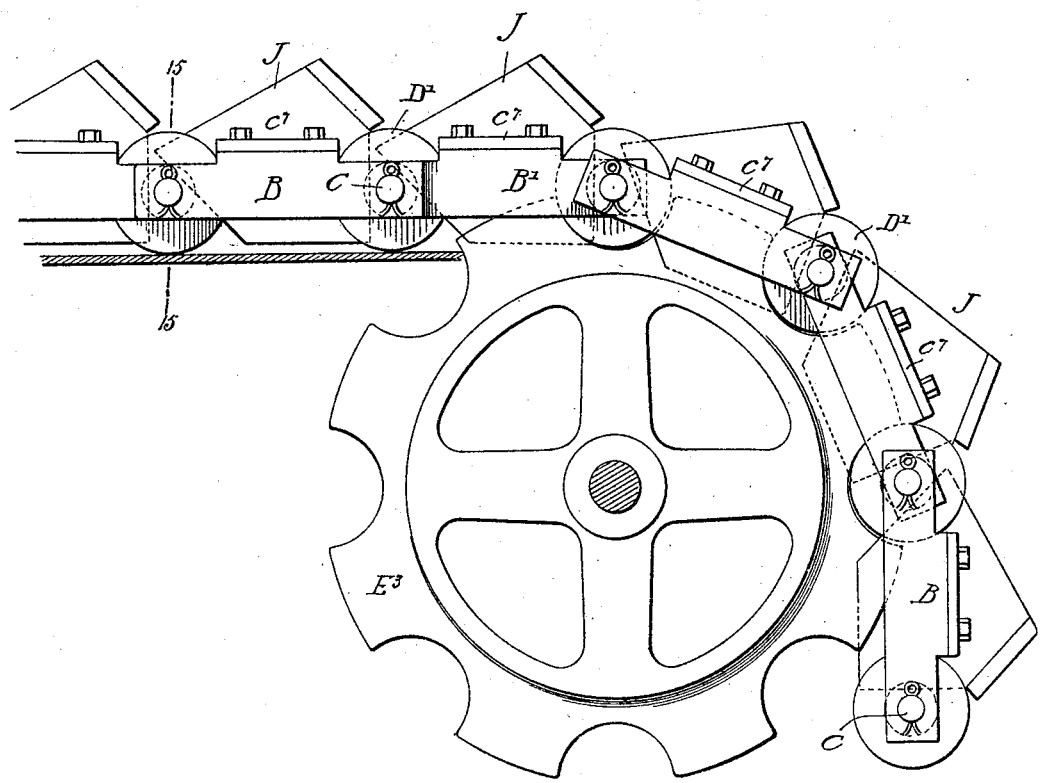
Figure 15:
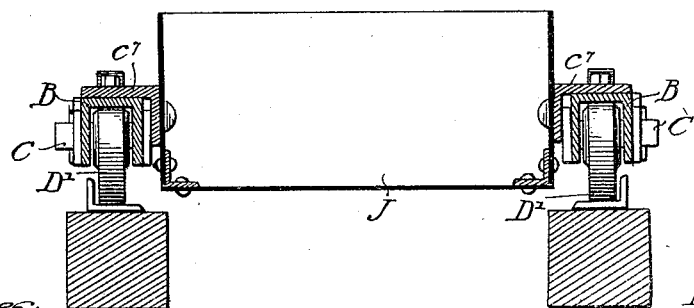

Figure 1 is a side elevation, partly in section, of a portion of a pig-casting machine, showing our improved link as applied thereto. Fig. 2 is a transverse sectional elevation taken on the line 2 2, Fig. 1, and illustrating the detail construction of the device. Fig. 3 is a plan view of a portion of the machine shown in Fig. 1. Fig. 4 is a plan view of a modified form of our invention. Fig. 5 is a transverse sectional elevation taken on the line 5 5, Fig. 4. Fig. 6 is a side elevation, partly in section, of a portion of the pig-casting machine, illustrating another form of our invention. Fig. 7 is a transverse sectional elevation taken on the line 7 7, Fig. 6. Fig. 8 is a sectional elevation of a portion of a platform conveyer, showing our invention as applied thereto. Fig. 9 is a plan view of the conveyer shown in Fig. 8. Fig. 10 is an elevation, partly in section, taken on the line 10 10, Fig. 9. Fig. 11 is a portion of a bucket conveyer in which links constructed according to our invention are employed to carry the buckets. Fig. 12 is a plan view of the construction shown in Fig. 11. Fig. 13 is an enlarged elevation, partly in section, taken on the line 13 13, Fig. 12, illustrating the detail construction of the links. Figs. 14 and 15 are respectively a side and a sectional elevation of a second form of bucket conveyer, illustrating the application of our invention thereto, Fig. 15 being a section taken on the line 15 15, Fig. 14. Figs. 16, 17, and 18 are respectively a side elevation, partly in section, a plan view, and a sectional end elevation of a form of our invention in which the individual links are made in two pieces fastened together, Fig. 16 being taken on the line 19 19, Fig. 17, Fig. 18 being taken on the line 21 21, same figure.

It will be understood that the use of the link hereinafter described and the manner of supporting a load thereby is not in any way limited to a pig-casting machine, since, as shown in various ones of the figures of drawings, it may be employed with advantage in any form of link conveyer in which a load of any kind is carried by links having guide or supporting wheels or their equivalents.

So far as we are aware it has hitherto been customary, particularly in pig-casting machines, to apply the load carried by each link or pair of links so that it was transferred to the pins for the guide-wheels or supporting-bushings only at one end thereof, with the result that said load was to a great extent unbalanced relatively to its supporting member and concentrated upon a relatively small portion of the surface of the journal pin or bushing. By our invention we form the links and so apply their load that this latter is transferred to both ends of the journal-pins connecting the links, with the result that of a given load carried by any link one quarter of it is carried at one end of a pin and a second quarter carried at the end of the same pin.

Referring to Figs. 1 to 3 of the above drawings, A represents the various pig-molds of the casting-machine, and it will be seen that each of these has at each of its ends projecting lugs $a$. Each of the links B or B' upon which the respective molds are carried consists of two substantially vertical side plates $b$, connected by what is preferably an integral section $b'$, so placed as to be substantially equidistant from their ends. This construction causes each link to be of a substantially U-shaped section at and adjacent to its middle portion, and a substantially horizontal plate $c$ has one end riveted or otherwise fixed to the said part $b'$, so that it projects toward and under the lug $a$ of the mold A. A bolt $c'$ connects these two parts, so that it will be seen that the weight of each mold may be considered as applied to each link at a point equidistant from its ends and midway between its two side members $b$. Successive links B and B' are connected by journal-pins C, held in place by cotter-pins $c^4$, there being upon each of said pins between the ends $b$ of each link a guide or supporting wheel D, constructed to operate on a rail $e$ or upon sprockets E. With this arrangement of parts it will be seen that the weight of any one of the various molds is divided between the two ends of a journal-pin, so that whatever wear there is occurs equally at both of said ends and also takes place in the customary manner on the wheels D. By reason of this even distribution of load upon the various wheels the wear upon their faces and flanges as well as upon the tracks and guide or idler pulleys occurs in the least harmful manner and places.

If desired, the molds instead of having a horizontal projecting lug, as shown in Figs. 1 to 3, inclusive, may be constructed, as shown at $a'$ in Figs. 4 and 5, with a vertical bolting-face. In such a case the connecting-piece between the link and the mold would preferably be of the angular form shown at $c^2$, being held to said mold by a bolt $c^5$.

If desired, the connecting-piece $c$ or $c^2$ may be omitted entirely, as shown in Figs. 6 and 7, in which case the projecting lug at the end of each pig-mold would be somewhat elongated and bolted directly to the horizontal or connecting member $b'$ of the link, in any case, however, causing the load to be centrally applied to each link, and thereby distributed equally to the ends of the journal-pins for the guide-wheels.

In Figs. 8, 9, and 10 we have illustrated our improved form of link as applied to a conveyer of the platform type or to a platform commonly found in what are known as "horse-powers." Individual plates or planks G, forming the platform, are bolted to the U-shaped link-sections B in the manner heretofore described, and the pins or journals C, which pass through the vertical members of these sections to connect successive links, also carry rollers or bushings $h$, which engage with the sprocket-wheel E' in the well-known manner.

The bucket conveyer (illustrated in Figs. 11 to 13, inclusive) has directly bolted to it buckets I, while the journal-pins, as in the case previously noted, are provided with bushings $h'$ for engagement with the sprocket-wheel $E^2$. In this case it will be seen that the weight of each bucket and whatever load it may carry is centrally placed upon each link and is symmetrically applied to the pins C and the sprocket-wheel $E^2$.

In the structure illustrated in Figs. 14 and 15 the link-sections, while being of substantially the same shape and construction as heretofore described, each has bolted to it one flange of an angle-piece $c^7$, whose second flange is bolted to the perpendicular side of one of the boxes J, forming the receptacle for material to be conveyed. As shown in Fig. 15, each box is supported between the two opposite links of two parallel chains, of which the links are connected by the pins C, upon which operate supporting or guide wheels D'. The sprocket $E^3$ is, as illustrated in Fig. 1, constructed to receive and guide these wheels.

In constructing a chain or conveyer as above described it is not necessary that the individual links be made in one piece, since they may, as shown in Figs. 16 to 18, inclusive, be formed of sections, as $B^2$ and $B^3$, of which each consists of a substantially vertical portion $b$, having a horizontally-extending part $b^8$. By making the vertical member $b$ of the parts $B^3$ of greater height than that of the similar member of parts $B^2$ its horizontally-extending portion may be made to overlap the horizontal portion of said section $B^2$, and these two may be bolted together and to the projecting lug of a pig-mold or other form of conveyer in the manner shown in Fig. 2.

We claim as our invention—

1. The combination of a series of links each consisting of two substantially parallel plates, a third plate extending between two longitudinal edges of said first plates, conveying structures centrally carried by the connecting-plates of the links, and means for connecting successive links, substantially as described.

2. A link including two side plates and a plate at right angles to and connecting said plates, in combination with a conveying structure fixed to said connecting-plate so as to distribute its weight equally to the two side plates of the link, substantially as described.

3. The combination with a chain including links each having two side members and a member connecting the same, of means for connecting successive links, and supporting devices for the links, said devices being constructed to receive substantially equal loads from both side members, substantially as described.

4. The combination with a chain including links each having two side members and a member connecting the same, of means for connecting successive links, and structures to be operated by the chain and attached to the connecting members of the links in such manner that the strain from said structures is equally distributed between the side members of each link, substantially as described.

5. The combination with a chain including links each having two side members and a member rigidly connecting the same, of pins connecting the links, and a wheel on each pin between the side members of successive links, substantially as described.

6. The combination of a series of links each including two side plates and a plate substantially at right angles to and connecting said side plates, a series of conveying structures fixed respectively to the connecting-plates of the links so as to distribute their weights equally to the two side plates of each link, pins connecting successive links, and wheels on the pins between the side members of said links, substantially as described.

7. The combination of a series of links having connecting-pins and each including two side plates and a plate connecting said side members, with structures carried by the links and applied to substantially the central portions of the connecting-plates, substantially as described.

8. In a pig-casting machine, the combination of a series of molds, chains supporting said molds, each chain including a series of links having side members and a member rigidly connecting said side members, pins connecting successive links, and guide-wheels on said pins between the side members of said links, each of the molds having its ends supported by the connecting members of a pair of links, substantially as described.

9. In a pig-casting machine, the combination of a series of molds, chains for supporting said molds, each chain including a series of links having side members and a member rigidly connecting said side members, pins connecting successive links, and guide-wheels on said pins between the side members of said links, each of the molds having its ends supported by the connecting members of a pair of links, the connection between each mold and the links being arranged so that the weight of said mold is distributed equally between the two side members of the link, substantially as described.

10. The combination in a pig-casting machine of a series of molds and chains for conveying the same, said chains including links each having two side members and a member rigidly connecting said side members, with a plate for each end of each mold, said plate being connected to the mold and to the connecting member of the link so that the weight of the mold is distributed equally between the side members of the link, substantially as described.

11. The combination in a pig-casting machine of chains each having a series of links, pins connecting the links, and a series of pig-molds having means for connecting them to the links so that their weight is distributed equally upon the two ends of each pin, substantially as described.

12. The combination in a pig-casting machine of a series of molds each having projecting lugs at its ends, chains for the molds each including a series of links having two side plates and a substantially horizontal plate connecting the same, a wheel between the side plates of the adjacent ends of successive links, and pins connecting successive links and extending through their respective wheels, with a connecting-piece fixed to the horizontal portion of each link and attached to the projecting lug at the end of the mold, substantially as described.

In testimony whereof we have signed our names to this specification in the presence of two subscribing witnesses.

JACOB B. McKENNAN.
AXEL H. HELANDER.

Witnesses:
JAMES H. ROBINSON,
A. L. BENZ.